United States Patent
Hood et al.

(10) Patent No.: US 10,273,324 B2
(45) Date of Patent: *Apr. 30, 2019

(54) POLYVINYLAMIDE POLYMERS CONTAINING POLYMERIZABLE FUNCTIONALITIES

(71) Applicant: ISP INVESTMENTS LLC, Wilmington, DE (US)

(72) Inventors: David K. Hood, Basking Ridge, NJ (US); Osama M. Musa, Hillsborough, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,939

(22) Filed: Feb. 5, 2016

(65) Prior Publication Data

US 2016/0280826 A1    Sep. 29, 2016

Related U.S. Application Data

(63) Continuation of application No. 12/673,637, filed as application No. PCT/US2008/073344 on Aug. 15, 2008, now abandoned.

(60) Provisional application No. 61/073,535, filed on Jun. 18, 2008, provisional application No. 60/955,947, filed on Aug. 15, 2007.

(51) Int. Cl.
| | |
|---|---|
| *C08F 220/60* | (2006.01) |
| *C08F 218/08* | (2006.01) |
| *C08F 226/06* | (2006.01) |
| *C08F 226/10* | (2006.01) |
| *C09D 133/06* | (2006.01) |
| *C09D 139/04* | (2006.01) |
| *C08F 220/58* | (2006.01) |
| *C09D 139/06* | (2006.01) |
| *C08F 220/26* | (2006.01) |
| *C08F 220/32* | (2006.01) |

(52) U.S. Cl.
CPC .......... *C08F 220/60* (2013.01); *C08F 218/08* (2013.01); *C08F 226/06* (2013.01); *C08F 226/10* (2013.01); *C09D 133/066* (2013.01); *C09D 139/04* (2013.01); *C08F 220/26* (2013.01); *C08F 220/32* (2013.01); *C08F 220/58* (2013.01); *C08F 2220/603* (2013.01); *C08F 2800/20* (2013.01); *C09D 139/06* (2013.01)

(58) Field of Classification Search
CPC .............. C08F 220/58; C08F 220/60; C08F 2220/603; C08F 226/06; C08F 226/10; C09D 133/068; C09D 139/04; C09D 139/06

See application file for complete search history.

(56) References Cited

U.S. PATENT DOCUMENTS

| | | | | |
|---|---|---|---|---|
| 3,787,380 A | * | 1/1974 | Stamberger | C08F 26/06 524/548 |
| 3,862,091 A | * | 1/1975 | Barabas | C08F 226/04 525/157 |
| 3,997,306 A | | 12/1976 | Hedden | |
| 4,048,077 A | | 9/1977 | Engelhardt et al. | |
| 4,070,348 A | | 1/1978 | Kräemer et al. | |
| 4,070,532 A | | 1/1978 | Hammer | |
| 4,382,902 A | * | 5/1983 | Feurer | B29D 11/00134 264/1.36 |
| 4,409,105 A | | 10/1983 | Hayashi et al. | |
| 4,737,544 A | | 4/1988 | McCain et al. | |
| 4,806,449 A | * | 2/1989 | Hofmann | G03F 7/033 430/281.1 |
| 4,989,607 A | | 2/1991 | Keusch et al. | |
| 5,059,632 A | * | 10/1991 | Horn | C08F 216/1416 264/157 |
| 5,106,875 A | | 4/1992 | Horn et al. | |
| 5,159,360 A | | 10/1992 | Stoy et al. | |
| 5,362,830 A | * | 11/1994 | Chuang | C08F 8/00 524/765 |
| 5,571,860 A | | 11/1996 | Kukkala et al. | |
| 5,684,105 A | | 11/1997 | Zhong et al. | |
| 5,712,356 A | * | 1/1998 | Bothe | C08F 226/06 526/264 |
| 6,242,133 B1 | | 6/2001 | Kato et al. | |
| 6,277,498 B1 | | 8/2001 | Endo et al. | |
| 6,590,050 B1 | | 7/2003 | Bair et al. | |
| 6,716,992 B2 | | 4/2004 | Musa | |

(Continued)

FOREIGN PATENT DOCUMENTS

| | | |
|---|---|---|
| EP | 0103184 | 3/1984 |
| EP | 0248395 | 12/1987 |

(Continued)

OTHER PUBLICATIONS

Kao et al., "UV Curable Bioadhesives: Copolymers of N-Vinyl Pyrrolidone," Journal of Biomedical Materials Research Part A, vol. 38, Issue 3, pp. 191-196 (Fall 1997).

Nagaoka, S. et al., "Low-friction hydrophilic surface for medical devices," Biomaterials, vol. 11, pp. 419-424 (Aug. 1990).

PCT, International Search Report, International Application No. PCT/US2008/073344 (dated Oct. 30, 2008; published Feb. 19, 2009).

PCT, International Preliminary Report on Patentability, International Application No. PCT/US2008/073344 (dated Feb. 16, 2010).

O'Connell, M.J. et al., "Reversible water-solubilization of single-walled carbon nanotubes by polymer wrapping," Chemical Physics Letters, 342, pp. 265-271 (2001).

(Continued)

*Primary Examiner* — Bijan Ahvazi
*Assistant Examiner* — David L Miller
(74) *Attorney, Agent, or Firm* — William J. Davis, Esq.

(57) ABSTRACT

The present invention relates to a polymer comprising an N-vinyl amide monomer and a dual functional monomer. In the case where the dual functional monomer incorporates a glycidyl acrylate, a third polymerizable monomer is also included. The polymer can be varied in charge.

1 Claim, No Drawings

(56) References Cited

U.S. PATENT DOCUMENTS

| | | |
|---|---|---|
| 6,753,434 B1 | 6/2004 | Musa |
| 7,008,979 B2 | 3/2006 | Schottman et al. |
| 7,199,249 B2 | 4/2007 | Liu et al. |
| 7,264,876 B2 | 9/2007 | Smalley et al. |
| 7,300,022 B2 | 11/2007 | Muller |
| 8,242,224 B2 | 8/2012 | Hood et al. |
| 8,629,229 B2 * | 1/2014 | Hood ............... C08F 226/02 526/264 |
| 9,169,344 B2 * | 10/2015 | Hood .................. C08F 8/00 |
| 9,290,721 B2 * | 3/2016 | Hood ................ C11D 3/0021 |
| 9,487,609 B2 * | 11/2016 | Hood ............... C08F 220/28 |
| 2002/0107337 A1 * | 8/2002 | Rosenzweig ....... C08F 220/56 525/474 |
| 2002/0185222 A1 | 12/2002 | Wigdorski et al. |
| 2004/0014903 A1 | 1/2004 | Musa |
| 2006/0088675 A1 | 4/2006 | Hladik et al. |
| 2006/0128916 A1 * | 6/2006 | Schrod ................ C08F 8/14 526/258 |
| 2007/0049651 A1 | 3/2007 | Watanabe |
| 2007/0056900 A1 | 3/2007 | Mathauer et al. |
| 2007/0212556 A1 | 9/2007 | Musa et al. |
| 2008/0225099 A1 | 9/2008 | Cohen et al. |

FOREIGN PATENT DOCUMENTS

| | | |
|---|---|---|
| EP | 0368217 | 5/1990 |
| EP | 0368218 | 5/1990 |
| EP | 0687719 | 12/1995 |
| EP | 1158009 | 11/2001 |
| WO | 02/053620 | 7/2002 |
| WO | 2005/076074 | 8/2005 |

OTHER PUBLICATIONS

Qui, X. et al., "Copolymerization of N-Vinylcaprolactam and Glycidyl Methacrylate: Reactivity Ratio and Composition Control," Journal of Polymer Science, Part A: Polymer Chemistry, vol. 44, pp. 183-191 (2006).

Soundararajan, S. et al., "Glycidyl Methacrylate and N-Vinyl-2-pyrrolidone Copolymers: Synthesis, Characterization, and Reactivity Ratios," Journal of Applied Polymer Science, vol. 43, pp. 251-258 (1991).

* cited by examiner

POLYVINYLAMIDE POLYMERS CONTAINING POLYMERIZABLE FUNCTIONALITIES

CROSS REFERENCE TO RELATED APPLICATION

This application is a Continuation of U.S. application Ser. No. 12/673,637 filed Jun. 21, 2011, which is a national stage entry of PCT/US08/73344, filed Aug. 15, 2008, which claims the benefit of U.S. Provisional Application Ser. No. 60/955,947 filed Aug. 15, 2007 and U.S. Provisional Application Ser. No. 61/073,535 filed Jun. 18, 2008, the contents of each are hereby incorporated by reference.

FIELD OF THE INVENTION

The present invention relates to polyvinylamides containing polymerizable functionalities.

BACKGROUND OF THE INVENTION

For many applications employing polymeric materials, cross-linking of the polymer is a critical and necessary step in preparing many commercially viable products. Historically, one approach to cross-linking a polymer has been to introduce a reactive chemical component, commonly referred to as a "cross-linking agent." Typical examples of cross-linking agents are melamines, formaldehyde, chromates, polyfunctional silanes, zirconates, borates, polyfunctional acids and polyfunctional amines.

More recently, polymers have been developed which do not require the addition of a cross-linking agent. Many of these polymers employ glycidyl or amine functionalities to enable the polymer to form covalent bonds to itself or other functional materials. This approach is advantageous because the product formulation is simple and the resultant product is a commercially viable polymeric material. For example, crosslinked polymers of N-vinyl amides, such as N-vinyl pyrrolidone (VP) and N-vinyl caprolactam (VCL), can be made by the addition of a glycidyl methacrylate (GMA) functionality. See, B. S. R. Reddy et. al. in the Journal of Applied Polymer Science, Vol. 43, 251-258 (1991) and S. A. Sukhishvili et. al. in the Journal of Polymer Science: Part A: Polymer Chemistry, Vol. 44, 183-191 (2006).

Also, EP 0 103 184 assigned to Diamond Shamrock discloses terpolymers of GMA (50%) and VP(40%) and hydroxyethylmethacrylate (HEMA) (10%). Finally, US 2007/0056900 assigned to BASF discloses polymers comprising 60-99% by weight of a least one N-vinyl amide (e.g VP, VCL) and 1-40% by weight of at least one monomer selected from, for example, GMA, HEMA, aminostyrene compounds, and imidazoles.

Given the many uses for cross-linked polymeric materials, there is a constant need for a next generation cross-linkable polymers. The present invention is directed to polymers containing polymerizable functionalities.

SUMMARY OF THE INVENTION

The present invention relates to a polymer comprising an N-vinyl amide monomer and a dual functional monomer. In the case where the dual functional monomer incorporates a glycidyl acrylate, a third polymerizable monomer is also included. The polymer can be varied in charge.

DETAILED DESCRIPTION OF THE INVENTION

The present invention relates to polymers comprising a N-vinyl amide monomer and a dual functional monomer. In the case where the dual functional monomer comprises a glycidyl acrylate, a third polymerizable monomer is also included.

The term "N-vinyl amide monomer" refers to monomers including, but not limited to, N-vinyl pyrrolidone, N-vinyl valerolactam, N-vinyl caprolactam, and N-vinyl formamide. N-Vinyl pyrrolidone, N-vinyl formamide, and N-vinyl caprolactam are preferred.

The term "dual functional monomer" refers to monomers having the structure

where Q is an oxirane, oxetane, aziridine, oxazoline, or benzoxazine, E is a polymerizable functionality containing a carbon-carbon double bond and R is an aliphatic and/or aromatic moiety with or without a heteroatom. It is possible to incorporate the monomer into a polymer yielding a free carbon-carbon double bond and/or a free, ionically polymerizable functionality.

In accordance with particular aspects of the present invention the dual functional monomer may be a monomer having the structure

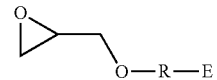

where E is a polymerizable functionality containing a carbon-carbon double bond and R is an aliphatic and/or aromatic moiety with or without a heteroatom. It is possible to incorporate the monomer into a polymer yielding a free, polymerizable double bond and/or free, polymerizable oxirane ring.

The term "glycidyl acrylates" refers to alkyl acrylate monomers having a glycidyl group attached to an alkyl acrylate monomer. Further, the alkyl group can be, but not limited to, a C1-C12 carbon atom. Non limiting examples of suitable alkyl acrylate monomers are the glycidyl (alkyl) acrylates such as, GMA, glycidyl ethacrylate, glycidyl butylacrylate, and glycidyl dodecyl acrylate. Preferred glycidyl (alkyl) acrylates useful in the practice of the present invention include GMA, glycidylethacrylate, glycidylbutylacrylate and glycidyldodecylacrylate. GMA is a particularly useful monomer.

The term "third polymerizable monomer" refers to additional monomers present in the composition including, but not limited to HEMA, vinyl acetate (VA), ethyl acrylate, methyl acrylate, methylmethacrylate, di methylaminoethyl methacrylate (DMAEMA), dimethylaminopropyl methacrylate (DMAPMA), acrylamide, methacrylamide, acrylonitrile, ethylene, styrene, maleic anhydride (MAN), acrylic acid (AA), sodium vinylsulfonate, vinyl chloride, vinylpyridine, trimethylvinylsilane, vinyl propionate, crotonic acid, polyfunctional acrylate, polyfunctional allyl ether, vinyl imidazole, N-vinyl imidazole, vinyl carbonate and allyl acetate and allyl alcohol. Preferred third monomers useful in the practice of certain aspects of the present invention include HEMA, VA, crotonic acid, acrylamide, and MAN. HEMA, MAN, and VA are particularly useful. The third polymerizable monomer can be selected to yield a polymer varied in charge, resulting in an anionic, non-ionic, cationic, or zwitterionic polymeric material.

In accordance with one aspect of the present invention, a polymer comprising a N-vinyl amide monomer and a dual functional monomer is disclosed. The polymer comprises:
a) at least one N-vinyl amide monomer; and
b) at least one dual functional monomer having the structure

Q-R-E where Q is an oxirane, oxetane, aziridine, oxazoline, or benzoxazine, E is a polymerizable functionality containing a carbon-carbon double bond and R is aliphatic and/or aromatic moiety with or without a heteroatom. It is possible to incorporate the monomer into a polymer yielding a free carbon-carbon double bond and/or a free, ionically polymerizable functionality.

In the case where the dual functional monomer comprises glycidyl acrylate, a third polymerizable monomer is also present in the composition.

The polyvinyl amide containing polymerizable functionality of the present invention can be prepared by techniques known to those ordinarily skilled in the art such as bulk, solution, suspension and emulsion polymerization. Further, those ordinarily skilled in the art understand that the monomers used in preparing the polymer have functional groups which can be preferentially reacted to create a specific polymer for a specific application. Furthermore, it should be understood that reference to a polymer comprising certain monomers refers to the polymer formed as a reaction product of the specified monomers Specific dual functional monomers useful in accordance with the present invention include, without limitation, allyl glycidyl ether ([(2-propenyloxy) methyl]-oxirane), butadiene monoxide, 2-(1-aziridinyl)ethyl methacrylate, vinyl cyclohexene monoxide, 2-Isopropenyl-2-oxazoline, 1,3-diallyl-5-glycidylisocyanurate, dlycidyl N-(3-isopropenyl dimethylbenzyl)carbamate, 3-N-(6-propyl vinyl ether) benzoxazine, and 2-(3-methyl-3-oxetanemethoxy) ethyl vinyl ether. More than one dual functional monomer may be used.

Polymers in accordance with certain aspects of the present invention may be non-ionic, anionic, or cationic. Furthermore, polymers or compositions containing the polymers may be in powder, solid, liquid or solution form. Compositions comprising the polymer may be curable via UV radiation, electron beam, or gamma irradiation. The polymers may be utilized in the formulation of aqueous, UV curable coatings or in 100% solid, UV curable coatings. Compositions comprising the polymer may be thermally and/or cationically curable or thermally and/or anionically curable. The polymers or compositions containing the polymers may be thermoplastic polymers that can be produced in either liquid or powder form. Moreover, the polymers described herein or compositions containing the polymers may be suitable for extrusion and capable of forming extruded plastics containing the polymers. Polymers may also be used in the preparation of membranes. Other uses in addition to those set forth above are not particularly limited and can readily be determined by one of ordinary skill in the art.

The practice of the present invention is illustrated by the following non-limiting examples:

EXAMPLE 1

A 1.0 liter three neck, round bottom flask is fitted with anchor type agitator, thermocouple, one addition funnel, and nitrogen purging line. The flask is charged with 80 g of DI Water, 27 g of Ethanol SDA 40B, 80 g of VCL and Ethanol. The system is purged three times with nitrogen and then nitrogen is blanketing the system during the reaction. The flask is heated to 80° C., during which the addition funnel is charged with 15 g of DMAPMA, 5 g of HEMA, and mixed with 107.5 g of DI Water. At 80° C., a 0.208 g injection of Vazo-67 is added to the flask by first mixing the initiator with 1.1 g of Ethanol SDA 40B. After the initiator has been added, the drop-wise continuous addition of DMAPMA/HEMA/Water is started. Two more equivalent additions of initiator are added at 30 and 60 minute intervals. After the DMAPMA/HEMA/Water addition is completed, add the 88 g of DI Water for dilution. The final pH should be in range of 6.5 to 7.5 upon adjustment with hydrochloric acid. After pH adjustment, the ethanol is distilled off and replaced with DI water, while using Vacuum. After ethanol removal is completed, 3 g of GMA are added to the mixture and allowed to heat at 60° C. for one hour. A representative structure for the reaction product is presented below:

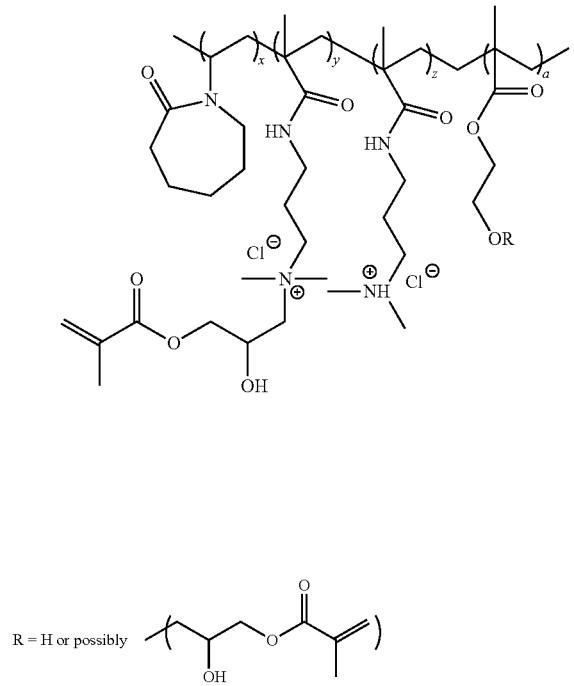

EXAMPLE 2

A 300 mL glass flask is fitted with an overhead agitator and thermocouple. The flask is charged with 10 g of VP/AA/Lauryl methacrylate terpolymer (Styleze 2000) and 90 g of 50/50 water and ethanol blend. The pH is adjusted to 6 to 7 with ammonium hydroxide. The system is purged three times with nitrogen and then nitrogen is blanketing the system during the reaction. The flask is heated to 60° C. Upon achieving temperature, 1.2 g of GMA is added dropwise. The mixture and allowed to heat at 60° C. for one hour. The polymer solution is cooled to room temperature and placed in a glass tray overnight, enabling the evaporation of water and ethanol. A representative structure for the reaction product is presented below, wherein $x+y+z+a=100$:

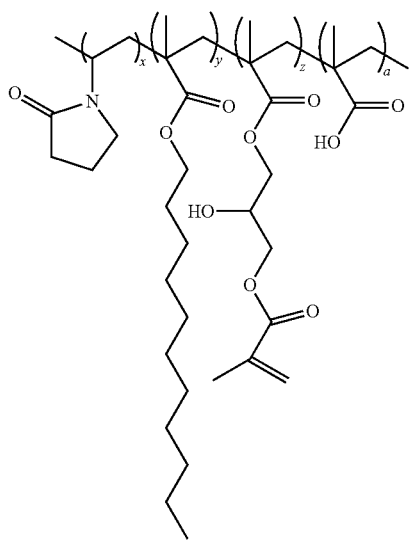

EXAMPLE 3

Prepare a two monomer/solvent blends. The heal is a blend of 10 g VP, 4 g GMA, and 80 g acetone. Mix thoroughly. Feed 1 is a blend of 30 g of VP, 10 g of VA, 4 g of GMA and 124 g of acetone. Mix thoroughly. To a 500 mL glass reaction vessel, equipped with a magnetic agitator, an addition funnel, and a chilled condenser, charge the heal and 5 g of Feed 1. Charge the remaining Feed 1 into the addition funnel. Commence purging of the reaction vessel by continuously with nitrogen. Begin heating to reflux, approximately ~57° C. In another separate vessel, prepare a mixture of 0.40 g of 2,2'-azobis(2,4-dimethylpentanenitrile) (VAZO 52) and 4 g of acetone (Feed 2). When the reaction flask has reached reflux temperature, charge 1 g of Feed 2 into the reaction vessel. Then commence a continuous, drop-wise addition of Feed 1 over a period of three hours. After one hour, charge 1 g of Feed 2 into the reaction vessel. Repeat this Feed 2 addition for the next two hours. At the completion of Feed 2 additions, allow one hour to elapse, charge the reaction vessel with another addition of initiator, charging 0.1 g of t-butylperoxy pivalate (Lupersol 11). The reaction vessel is allowed to heat at reflux an additional 1 hour, followed by another 0.2 g addition of Lupersol 11. Note that during the initiator shots, additional acetone was added to replace any that had volatilized. At the end of another one hour hold, the reaction vessel was cooled to room temperature. A representative structure for the reaction is presented below, wherein $x+y+z=100$:

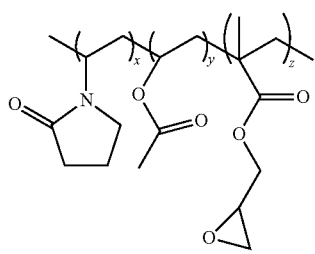

To demonstrate the functional utility of the reaction product, 1 g of ViviPrint 300 (HEMA/DMAPMA polymer) was diluted with 1 g of de-ionized water. To this solution, 1 g of the reaction product was added and mixed thoroughly. A quick heating of the sample to ~80° C. followed by cooling to room temperature formed a rigid, turbid gel.

It is envisioned that other functional polymers, such as polyamines, carboxylated polymers, hydroxylated polymers, carboxylated styrene/butadienes, carboxylated acrylates, amine functional acrylates and latexes, and the like will be suitable for reacting with glycidyl functional materials such as this example.

Examples 4-6 are prophetic examples of certain aspects of the present invention.

EXAMPLE 4

A 1.0 liter three neck, round bottom flask is fitted with an anchor type agitator, thermocouple, one addition funnel, a chilled condenser and nitrogen purging line. The flask is charged with 140 g of acetone and 40 g of VCL. The system is purged three times with nitrogen and then nitrogen is blanketing the system during the reaction. The flask is heated to reflux, ~57° C., during which the addition funnel is charged with 20 g of VA, 5 g of GMA and mixed with 100 g of acetone. At reflux, a 0.208 g injection of azobisisobutyronitrile is added to the flask by first mixing the initiator with 1.1 g of acetone. After the initiator has been added, the drop-wise continuous addition of VA is started. five more equivalent additions of initiator are added at 60 minute intervals. The product is cooled to room temperature.

EXAMPLE 5

120 g of MAN is dissolved in 455 g of toluene at 70° C. The solution is placed in an addition funnel. In a separate addition funnel, 30 g of GMA is added to 50 g of toluene. 170 g of VP and 335 g of toluene are charged into the reaction vessel. The system is purged with nitrogen. The temperature of the reaction vessel is raised to 55° C. and VAZO 5 g initiator is added. Then the drop-wise addition of the MAN and GMA commences and is completed after 2.5 hours. The system is allowed to agitate further for one hour. The precipitated polymer is filtered, re-slurried in heptane, and re-filtered. The polymer is allowed to air dry for 1 hour and is then vacuum dried at 35° C.

EXAMPLE 6

In a 500 ml round bottom flask, equipped with an overhead agitator, 50 g of VP/DMAEMA polymer (mw ~80,000 to 150,000 g/mol) powder is added to 200 g of vigorously agitating de-ionized water. The solution is allowed to mix until powder is completely solvated. The reaction vessel is heated to 60° C. To this polymer solution, 2.5 g of GMA is added drop-wise. The mixture is allowed to heat for one hour, then cooled to room temperature.

EXAMPLE 7

Aqueous UV Curable Coating

| Product | Supplier | Mass (g) | Percent Solids | Dry Mass (g) | Wt % Dry Film Composition |
|---|---|---|---|---|---|
| Water | | 3.8 | | | |
| VCL/DMAPMA/HEMA/GMA/HCL | | 3.8 | 30 | 1.14 | 70.6 |
| UCECOAT 6558, an aliphatic urethane acrylate solution in water | Cytec Surface Specialty | 0.5 | 50 | 0.25 | 15.5 |
| Ammonium Hydroxide | Aldrich | 1.45 | | | |
| HEMA | Aldrich | 0.2 | 100 | 0.2 | 12.4 |
| Darocur 1173, 2-hydroxy-2-methyl-1-phenyl-1-propanone | Ciba Specialty Chemicals | 0.025 | 100 | 0.025 | 0.16 |
| Total | | 9.775 | | 1.615 | 99 |

The coating example above provides a print receptive on a variety of substrates including polyester, vinyl, paper, canvas, Tyvec, polyolefins, and the like.

Other suitable components for aqueous based coatings of this invention include silicate and silica gels, free radical initiator, aluminates and aluminas, N-vinyl-2-pyrrolidone, N-vinyl-caprolactam, other N-vinyl amides, 1-vinyl imidazole, 4-acryloyl morpholine, polyvinyl pyrrolidone, polyvinyl alcohol, acetoacetylated polyvinyl alcohol, oxygen scavengers, styrene/acrylate latex, acrylic latexes, polyalkylene glycols, maleic anhydride-co-methyl vinyl ether polymers, polyalkylene imines, oxetanes, oxazolines, benzoxazines, polydi allyldialkylammonium chloride materials, starch, polyurethanes, acrylated oligomers of polyurethanes, acrylated glycidyl oligomers, polyfunctional acrylates, polyfunctional aziridines, clays, calcium carbonates, talcs, cellulosics, vinyl ethers, epoxy based dispersions, anionic surfactants (i.e., sodium lauryl sulfate), non-ionic surfactants, cationic surfactants, silane or silicone based polymers, and anionic polyacrylates such as polyacrylic acid.

EXAMPLE 8

100% Solid UV Curable Coating

| Product | Supplier | Mass (g) | Percent Solids | Dry Mass (g) | Wt % Dry Film Composition |
|---|---|---|---|---|---|
| HEMA | Aldrich | 1.04 | 100 | 1.04 | 52 |
| VCL/DMAPMA/HEMA/GMA/HCL | | 0.3 | 100 | 0.3 | 15.1 |
| DVE-3, Triethylene glycol divinyl ether | ISP | 0.2 | 100 | 0.15 | 7.5 |
| CN963B80, aliphatic polyester based urethane diacrylate oligomer blended with 20% SR238, hexane diol diacrylate (HDDA) | Sartomer | 0.43 | 100 | 0.43 | 21.6 |
| Darocur 1173 | Ciba Specialty Chemicals | 0.07 | 100 | 0.07 | 3.5 |
| Total | | 2.04 | | 1.99 | 99.7 |

The coating presented above is print receptive and adheres to flame treated polypropylene. Other substrates useful include polyester, vinyl, canvas, paper, Tyvec, saran, and the like. Other suitable components for such coatings include monomers such as N-vinyl-2-pyrrolidone, N-vinyl-2-caprolactam, N-vinyl imidazole, 4-acryloyl morpholine, vinyl ethers, vinyl acetates, styrenics, (meth)acrylates, polyacrylates, surfactants (anionic, non-ionic, cationic), oxetanes, oxazolines, benzoxazines, ketones, isocyanate based monomers and polymers, acrylated oligomers, oxygen scavengers, moisture scavengers, free radical initiators, cationic initiators, silica/silicates, alumina/aluminates, salts of alumina, salts of chromium, salts of barium, polyalkylene glycols, acrylated polyalkylene glycols, chlorinated polymers, sulfonated polymers and vinyl silanes.

EXAMPLE 9

Hydrophilic Additive for Membranes

Employing the teachings of U.S. Pat. No. 7,300,022 B2 (the contents of which are hereby incorporated by reference) as a guide for the production of flat sheet membranes, a dope solution was prepared using PVP/VA/GMA.

| Product | Supplier | Mass (g) |
| --- | --- | --- |
| UDEL PS 3500 LCD (polysulfone) | Solvay | 17.1 |
| LiCL., lithium chloride | Aldrich | 3.54 |
| PVP/VA/GMA | | 2.73 |
| Gantrez AN-119, maleic anhydride-co-methyl vinyl ether polymer | ISP | 3.09 |
| NMP, N-methyl-2-pyrrolidone | ISP | 74.3 |
| Total | | 100.76 |

All ingredients were combined and allowed to mix. The dope solution was cast onto a glass plate using a glass rod and a membrane was cast and heated to 60° C. for 10 minutes. The coating was allowed to stand for 24 hours. The membrane was then immersed in a precipitation bath consisting of 45% PEG-200, 45% water, and 10% NMP. The membrane was immersed in the precipitation bath for 10 minutes or until the membrane release from the glass plate and readied for inspection. In another embodiment, PVDF (polyvinylidene fluoride polymer) is also suitable for use in forming a membrane.

In an embodiment of the invention, the polymer is comprised of 20-80 wt % of a N-vinyl amide monomer, 1.0-25 wt % of an alkyl acrylate monomer having a functional group wherein the functional group is selected from a glycidyl group or mixtures thereof; and 1.0-80 wt % of a third polymerizable monomer.

In another embodiment of the invention, the polymer is comprised of 30-70 wt % of a N-vinyl amide monomer, 3.0-20 wt % of an alkyl acrylate monomer having a functional group wherein the functional group is selected from a glycidyl group or mixtures thereof, and 5.0-60 wt % of a third polymerizable monomer.

In a further embodiment of the invention, the polymer is comprised of 40-60 wt % of a N-vinyl amide monomer, 5.0-15 wt % of an alkyl acrylate monomer having a functional group wherein the functional group is selected from a glycidyl group or mixtures thereof, and 10-50 wt % of a third polymerizable monomer.

In a further embodiment of the invention, the polymer is comprised of 5.0-95 wt % of a N-vinyl amide monomer and 95-5.0 wt % dual functional monomer, provided the dual functional monomer is not a glycidyl acrylate.

In a further embodiment of the invention, the polymer is comprised of 20-80 wt % of a N-vinyl amide monomer and 80-20 wt % dual functional monomer, provided the dual functional monomer is not a glycidyl acrylate.

In a further embodiment of the invention, the polymer is comprised of 40-60 wt % of a N-vinyl amide monomer and 60-40 wt % dual functional monomer, provided the dual functional monomer is not a glycidyl acrylate.

The polymers of the present invention are suitable for use in industrial, personal care, household, and pharmaceutical applications. Industrial uses include, but are not limited to, formulating inks, flocculation agents, surface modification agents, coatings, dispersants, hydrophilic enhancement agents for membranes, non-migratory anti-static agents and rheology modifiers. Personal care and household applications include, but are not limited to, formulating cosmetics, hair care products, toiletries, laundry products and household cleaning products. Pharmaceutical applications include, but are not limited to, processing aids, medical stents and other medical device coatings, optical lenses, formulating drug delivery systems, and preparing tablet coatings.

What is claimed:
1. A polymer consisting of:
   a) 15-92 weight % of a N-vinyl caprolactam (VCL) monomer;
   b) 1-10 weight % of a glycidyl methacrylate (GMA);
   c) 5-10 weight % of a dimethylaminopropyl methacrylamide (DMAPMA) monomer; and
   d) 2-7 weight % of a hydroxyethyl methacrylate (HEMA) monomer.

* * * * *